(12) United States Patent
Takiguchi et al.

(10) Patent No.: US 8,482,829 B2
(45) Date of Patent: Jul. 9, 2013

(54) LASER PROCESSING APPARATUS AND LASER PROCESSING METHOD

(75) Inventors: Yuu Takiguchi, Hamamatsu (JP); Naoya Matsumoto, Hamamatsu (JP); Norihiro Fukuchi, Hamamatsu (JP); Takashi Inoue, Hamamatsu (JP); Tamiki Takemori, Hamamatsu (JP); Naohisa Mukozaka, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 791 days.

(21) Appl. No.: 12/566,143

(22) Filed: Sep. 24, 2009

(65) Prior Publication Data

US 2010/0079832 A1    Apr. 1, 2010

(30) Foreign Application Priority Data

Oct. 1, 2008    (JP) ................................ P2008-256629

(51) Int. Cl.
*G03H 1/08*    (2006.01)

(52) U.S. Cl.
CPC ...................................... *G03H 1/08* (2013.01)
USPC ............................................................. 359/9

(58) Field of Classification Search
None
See application file for complete search history.

(56) References Cited

U.S. PATENT DOCUMENTS

2008/0145053 A1 * 6/2008 Holmes ........................... 398/79

FOREIGN PATENT DOCUMENTS

| CN | 1656397 | 8/2005 |
|---|---|---|
| JP | H2-092488 | 4/1990 |
| JP | H11-342486 | 12/1999 |
| JP | 2002-207202 | 7/2002 |
| JP | 3475947 | 9/2003 |
| JP | 2005-536073 | 11/2005 |
| JP | 2006-113185 | 4/2006 |
| JP | 2006-119427 | 5/2006 |
| WO | WO 2006041191 A1 * | 4/2006 |

* cited by examiner

*Primary Examiner* — Derek S Chapel
(74) *Attorney, Agent, or Firm* — Drinker Biddle & Reath LLP

(57) ABSTRACT

A laser processing apparatus 1 includes a laser light source 10, a phase modulation type spatial light modulator 20, a driving unit 21, a control unit 22, and an imaging optical system 30. The imaging optical system 30 may be a telecentric optical system. A storage unit 21A included in the driving unit stores a plurality of basic holograms corresponding to a plurality of basic processing patterns and a focusing hologram corresponding to a Fresnel lens pattern. The control unit 22 arranges in parallel two or more basic holograms selected from the plurality of basic holograms stored in the storage unit 21A, overlaps the focusing hologram with each of the basic holograms arranged in parallel to form the whole hologram, and presents the formed whole hologram to the spatial light modulator 20.

12 Claims, 15 Drawing Sheets

LASER PROCESSING APPARATUS AND LASER PROCESSING METHOD

BACKGROUND OF THE INVENTION

1. Field of the Invention

The present invention relates to an apparatus and method for radiating laser light to a processing target to process the processing target.

2. Related Background Art

Conventionally, for example, ink has been used to mark the date of manufacture or a serial number on, for example, cans. However, when ink is used, there are problems in that the ink peels off or environmental pollution occurs. As a method of solving the problems, laser marking has drawn attention. The laser marking focuses and radiates laser light to form minute holes in a processing target, such as a can, thereby marking, for example, alphanumeric characters.

As a laser marking method, generally, any of the following methods has been used: a method of using one laser beam to form dots one by one; and a method of arranging an intensity mask with respect to a wide laser beam and collectively performing laser processing. However, in the former case, since the dots are formed one by one, processing takes a long time. In the latter case, since laser light shielded by the intensity mask does not contribute to laser processing, a large amount of light is lost.

As a method for solving the above-mentioned problems, a method using a phase modulation type spatial light modulator (SLM) has been considered. That is, a computer generated hologram (CGH) is presented to the phase modulation type spatial light modulator, and each pixel modulates the phase of laser light input to the spatial light modulator. Then, the phase-modulated laser light is focused on a processing target by an imaging optical system, and the processing target is processed with a processing pattern formed by the focused image. The hologram presented to the spatial light modulator corresponds to the processing pattern of the processing target. In this way, the loss of light is reduced, and it is possible to collectively process multiple points on the processing target.

As shown in the flowchart in FIG. 11, in the laser processing method using the phase modulation type spatial light modulator, first, a desired processing pattern for the processing target is determined, and calculation is performed on the basis of the processing pattern to make a hologram. Then, the hologram is transmitted to a driving unit of the spatial light modulator, and the driving unit presents the hologram to the spatial light modulator. Thereafter, laser light is incident on the spatial light modulator (see JP-A-2006-113185).

SUMMARY OF THE INVENTION

Technical Problem

However, for example, it is necessary to perform marking in real time on a plurality of processing targets that are sequentially transported on a line. Considering the case in which numbers '0001' to '1000' are marked as serial numbers on 1000 processing targets, when the laser processing method above is used, a series of processes including a process of determining a processing pattern, a process of making a hologram, and a process of transmitting the hologram is repeatedly performed 1000 times.

However, in the laser processing method above, it takes a long time to perform the series of processes including the process of determining a processing pattern, the process of making a hologram, and the process of transmitting the hologram. In particular, since an algorithm, such as a GS method requiring, for example, FFT, is used to make the hologram, it takes a long time to perform the process. Therefore, when marking is sequentially performed on a plurality of processing targets in real time, the throughput of laser processing is lowered.

When holograms corresponding to all the processing patterns are made in advance and are stored in a storage unit, it is not necessary to make the hologram whenever marking is performed, which results in an increase in processing speed. For example, when a processing pattern having a character string "BABA" arranged in two rows and two columns as shown in FIG. 12 is collectively marked, a hologram corresponding to the processing pattern is made in advance and is stored in the storage unit. However, in this case, it is necessary to make holograms corresponding to all the processing patterns in advance and stores the holograms in the storage unit. Therefore, the amount of data required for the holograms to be stored in advance in the storage unit will be significantly large.

When the processing pattern is the arrangement of a plurality of basic processing patterns (for example, alphanumeric characters), it is considered that the basic processing patterns are marked one by one by laser light. However, when there are a large number of basic processing patterns to be marked, the throughput of laser processing is lowered.

In order to solve the above-mentioned problems, the following can be considered: a method of making a plurality of basic holograms corresponding to a plurality of basic processing patterns in advance, storing the basic holograms in a storage unit, reading the basic holograms corresponding to the basic processing patterns forming the whole processing pattern to be marked on a processing target from the storage unit, presenting the whole hologram having the basic holograms arranged in parallel therein to a spatial light modulator, and performing laser processing (marking).

As such, when a plurality of basic holograms are arranged in parallel on one spatial light modulator and are presented to the spatial light modulator, the size of each of the basic holograms is reduced. Therefore, the resolution of each of the basic holograms is lowered, which results in an increase in the size of the basic processing pattern to be reproduced (FIG. 13A). As a result, a plurality of basic processing patterns overlap each other on a processing surface of the processing target (FIG. 14).

In order to prevent a plurality of basic processing patterns from overlapping each other on a processing surface of the processing target, the following can be considered: a method of sufficiently increasing the size of a basic hologram to be prepared to increase the resolution and reducing the size of a basic processing pattern to be reproduced (FIG. 13B). However, when the sizes of the basic holograms corresponding to a plurality of basic processing patterns are increased, the size of the spatial light modulator is increased. As a result, an increase in the cost and size of a laser processing apparatus is inevitable.

In order to prevent a plurality of basic processing patterns from overlapping each other on a processing surface of the processing target, the following is also considered: a method of overlapping a blazed grating for determining the positions of the basic processing patterns formed on the processing target with the basic processing pattern and presenting them to the spatial light modulator. However, since the diffraction efficiency of the blazed grating is about 40% at lowest (FIG. 15), the light uniformity of the basic processing pattern to be reproduced is limited by the diffraction efficiency. As a result, it is difficult to maintain high uniformity.

When a plurality of spatial light modulators are used and the basic hologram is presented to each of the spatial light modulators, it is possible to increase the size of each of the basic holograms and thus prevent a plurality of basic processing patterns from overlapping each other on a processing surface of the processing target. However, in this case, since a plurality of spatial light modulators are used, an increase in the cost and size of a laser processing apparatus is inevitable. In addition, a system is needed that synchronizes a laser light source with a plurality of spatial light modulators.

The invention has been made in order to solve the above-mentioned problems, and an object of the invention is to provide a laser processing apparatus and a laser processing method capable of performing high-quality laser processing with high throughput and reducing the size of an apparatus.

Means for Solving the Problem

According to an aspect of the invention, there is provided a laser processing apparatus that radiates laser light to a processing target and collectively processes the processing target with a whole processing pattern including two or more basic processing patterns. The laser processing apparatus includes: a laser light source that outputs the laser light; a phase modulation type spatial light modulator that receives the laser light output from the laser light source, allows each of a plurality of pixels two-dimensionally arranged therein to be presented the whole hologram for modulating the phase of the laser light, and outputs the phase-modulated laser light; an imaging optical system that receives the laser light output from the spatial light modulator and focuses the laser light on the processing target; a storage unit that stores a plurality of basic holograms corresponding to a plurality of basic processing patterns and a focusing hologram corresponding to a Fresnel lens pattern; and a control unit that arranges in parallel two or more basic holograms selected from the plurality of basic holograms stored in the storage unit, overlaps the focusing hologram with each of the basic holograms arranged in parallel to form the whole hologram, and presents the formed whole hologram to the spatial light modulator.

In the laser processing apparatus according to the above-mentioned aspect, the imaging optical system may include a telecentric optical system. In the laser processing apparatus according to the above-mentioned aspect, the storage unit may store a plurality of focusing holograms corresponding to a plurality of Fresnel lens patterns having different focal lengths. The imaging position and imaging magnification of the imaging optical system may be variable. The control unit may control the focal length of the focusing hologram overlapped with the basic holograms and the imaging position or the imaging magnification of the imaging optical system so as to be associated with each other.

In the laser processing apparatus according to the above-mentioned aspect, the control unit may arrange a plurality of whole holograms on the spatial light modulator in parallel and presents the holograms to the spatial light modulator. The laser processing apparatus may include: an incident position adjusting unit that allows the laser light output from the laser light source to be sequentially incident on the plurality of whole holograms presented to the spatial light modulator; and an imaging position adjusting unit that adjusts the imaging position of the laser light on the processing target by the imaging optical system. The incident position adjusting unit may adjust the optical path of laser light from the laser light source to the spatial light modulator, or it may use a shutter. In addition, the imaging position adjusting unit may move the processing target, or it may adjust the optical path of the imaging optical system.

According to another aspect of the invention, there is provided a laser processing method that radiates laser light to a processing target and collectively processes the processing target with the whole processing pattern including two or more basic processing patterns. The laser processing method uses the laser light source, the phase modulation type spatial light modulator, the imaging optical system, and the storage unit. The laser processing method includes: arranging in parallel two or more basic holograms selected from a plurality of basic holograms stored in the storage unit; overlapping a focusing hologram with each of the basic holograms arranged in parallel to form the whole hologram; presenting the formed whole hologram to the spatial light modulator; allowing the laser light output from the laser light source to be incident on the spatial light modulator; and allowing the imaging optical system to focus the laser light output from the spatial light modulator on the processing target.

In the laser processing method according to the above-mentioned aspect, the imaging optical system may include a telecentric optical system. In the laser processing method according to the above-mentioned aspect, the storage unit may store a plurality of focusing holograms corresponding to a plurality of Fresnel lens patterns having different focal lengths. The imaging position and imaging magnification of the imaging optical system may be variable. The focal length of the focusing hologram overlapped with the basic holograms and the imaging position or the imaging magnification of the imaging optical system may be controlled so as to be associated with each other.

In the laser processing method according to the above-mentioned aspect, a plurality of whole holograms may be arranged in parallel on the spatial light modulator and be presented to the spatial light modulator. The laser light output from the laser light source may be sequentially incident on the plurality of whole holograms presented to the spatial light modulator. The imaging position of the laser light on the processing target by the imaging optical system may be adjusted. When the incident position of the laser light on the spatial light modulator is adjusted, the optical path of the laser light from the laser light source to the spatial light modulator may be adjusted, or a shutter may be used. In addition, when the imaging position is adjusted, the processing target may be moved, or the optical path of the imaging optical system may be adjusted.

Advantageous Effects Of Invention

According to the above-mentioned aspects of the invention, it is possible to perform high-quality laser processing with high throughput and reduce the size of an apparatus.

BRIEF DESCRIPTION OF THE DRAWINGS

FIG. 10 is a diagram illustrating an example of the whole processing pattern on the processing target 91;

DESCRIPTION OF THE PREFERRED EMBODIMENTS

Figure 1:
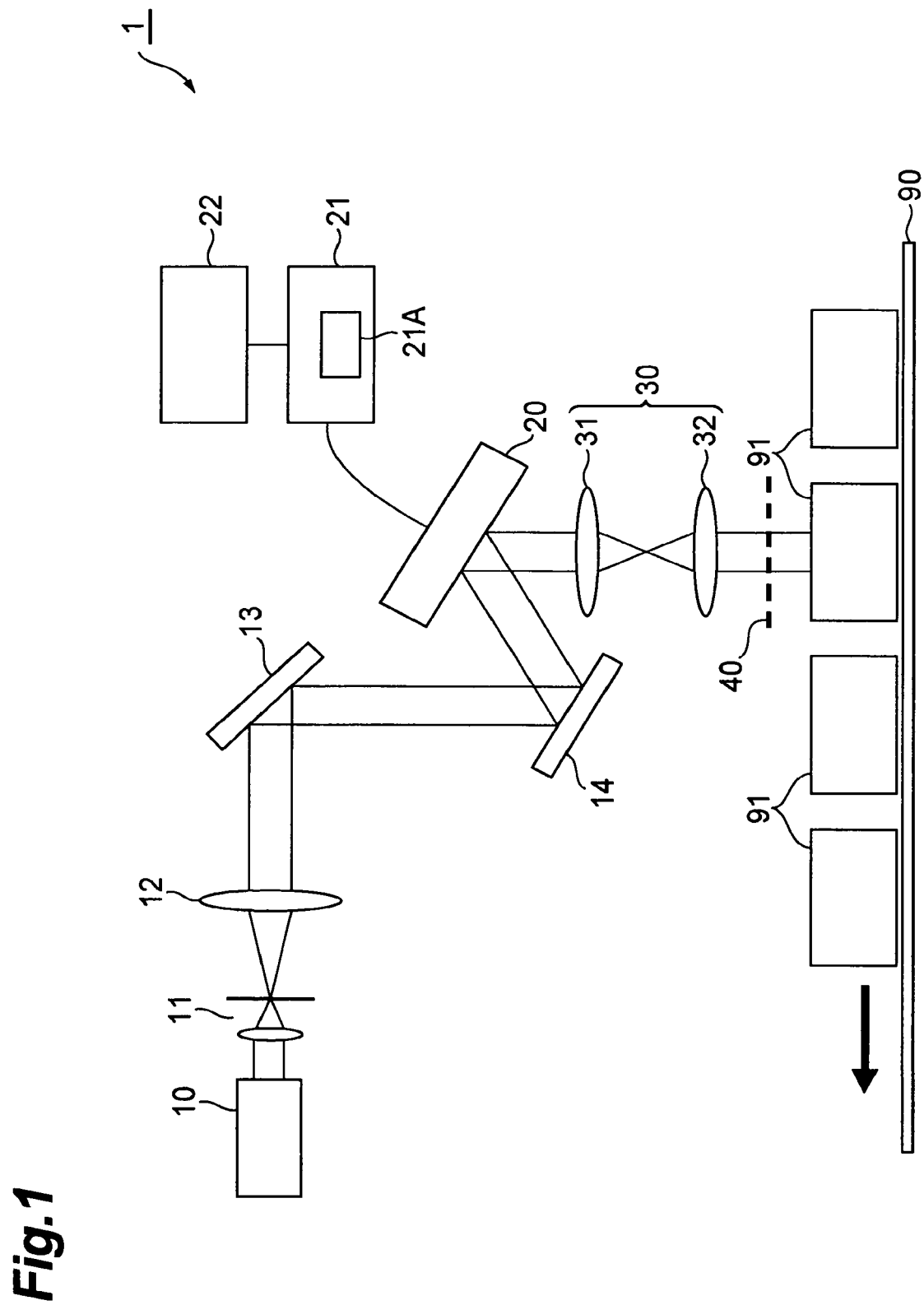
FIG. 1 is a diagram illustrating the structure of a laser processing apparatus 1 according to an embodiment of the invention.

Hereinafter, exemplary embodiments of the invention will be described in detail with reference to the accompanying drawings. In the drawings, the same components are denoted by the same reference numerals, and a repeated description thereof will be omitted.

FIG. 1 is a diagram illustrating the structure of a laser processing apparatus 1 according to an embodiment of the invention. The laser processing apparatus 1 shown in FIG. 1 sequentially focuses and radiates laser light to a plurality of processing targets 91 that are being moved on a moving line 90 to perform laser processing, such as marking, and includes a laser light source 10, a spatial filter 11, a collimator lens 12, a mirror 13, a mirror 14, a spatial light modulator 20, a driving unit 21, a control unit 22, an imaging optical system 30, and a shutter 40. In addition, instead of the moving line 90, a stage capable of two-dimensionally moving the processing targets 91 may be used.

The laser light source 10 outputs laser light to be radiated to the processing target 91. Preferably, a light source that outputs pulsed laser light in the ultraviolet range, such as a femtosecond laser light source, a Nd:YAG laser light source, or a Nd:YLF laser light, source, is used as the laser light source 10. The laser light output from the laser light source 10 passes through the spatial filter 11 and is then collimated by the collimator lens 12. The collimated laser light is reflected from the mirror 13 and the mirror 14 and is then input to the spatial light modulator 20. The mirror 13 or the mirror 14 may have, for example, the function of a galvano scanner.

The spatial light modulator 20 is a phase modulation type. When the laser light output from the laser light source 10 is input, each of a plurality of pixels that are two-dimensionally arranged in the spatial light modulator 20 is presented a hologram for modulating the phase of the laser light. Then, the spatial light modulator 20 outputs the phase-modulated laser light. It is preferable that the phase hologram presented to the spatial light modulator 20 be a computer generated hologram (CGH).

The spatial light modulator 20 may be a reflective type or a transmissive type. As the reflective spatial light modulator 20, any of the following spatial light modulators may be used: a LCOS (liquid crystal on silicon) spatial light modulator; a MEMS (micro electro mechanical systems) spatial light modulator; and an optical address type spatial light modulator. In addition, for example, an LCD (liquid crystal display) may be used as the transmissive spatial light modulator 20. FIG. 1 shows the reflective spatial light modulator 20.

The driving unit 21 sets the amount of phase modulation by each of a plurality of pixels that are two-dimensionally arranged in the spatial light modulator 20, and supplies a signal for setting the amount of phase modulation by each of the pixels to the spatial light modulator 20. The driving unit 21 sets the amount of phase modulation by each of the plurality of pixels that are two-dimensionally arranged in the spatial light modulator 20 to present a hologram to the spatial light modulator 20.

The imaging optical system 30 is provided in the next stage of the spatial light modulator 20. The imaging optical system 30 receives the laser light whose phase is modulated by each of the pixels in the spatial light modulator 20, and focuses the laser light on the processing target 91. In particular, the imaging optical system 30 includes a lens 31 and a lens 32 forming a telecentric optical system.

The shutter 40 allows the laser light to be radiated to the processing target 91 or prevents the laser light from being radiated to the processing target 91. In the structure shown in FIG. 1, the shutter 40 is provided in the next stage of the imaging optical system 30. However, the shutter 40 may be provided at any position on the optical path. It is preferable that the shutter 40 be synchronized with one or both the laser light source 10 and the spatial light modulator 20.

The control unit 22 is composed of, for example, a computer, and controls the driving unit 21 to write the hologram from the driving unit 21 to the spatial light modulator 20. In this case, the control unit 22 presents a hologram that allows the imaging optical system 30 to focus the laser light from the spatial light modulator 20 on a plurality of imaging positions to the spatial light modulator 20.

In particular, the laser processing apparatus 1 according to this embodiment radiates the laser light that has been output from the laser light source 10 and then phase-modulated by the spatial light modulator 20 to the processing targets 91, thereby processing collectively the processing targets 91 with the whole processing pattern including two or more basic processing patterns. In order to perform this operation, the driving unit 21 includes a storage unit 21A. The storage unit 21A stores a plurality of basic holograms corresponding to a plurality of basic processing patterns and a focusing hologram corresponding to a Fresnel lens pattern.

The control unit 22 arranges in parallel two or more basic holograms selected from the plurality of basic holograms stored in the storage unit 21A, and overlaps the focusing hologram with each of the basic holograms that are arranged in parallel to form the whole hologram. Then, the control unit 22 presents the whole hologram to the spatial light modulator 20.

For example, the basic processing pattern is an alphanumeric character, and the whole processing pattern is a character string having a plurality of basic processing patterns (alphanumeric characters) one-dimensionally or two-dimensionally arranged therein. The basic hologram is generated in advance so as to correspond to the basic processing pattern and is then stored in the storage unit 21A. The focusing hologram is also generated in advance and is then stored in the storage unit 21A. The whole hologram is formed on the basis of the basic holograms and the focusing hologram. The laser light is incident on the spatial light modulator 20 having the hologram presented thereto, and the phase of the laser light is modulated. Then, the phase-modulated laser light passes through the imaging optical system 30 and is then radiated to the processing targets 91. Then, the whole processing pattern composed of some basic processing patterns is generated on the processing target 91.

Figure 2:
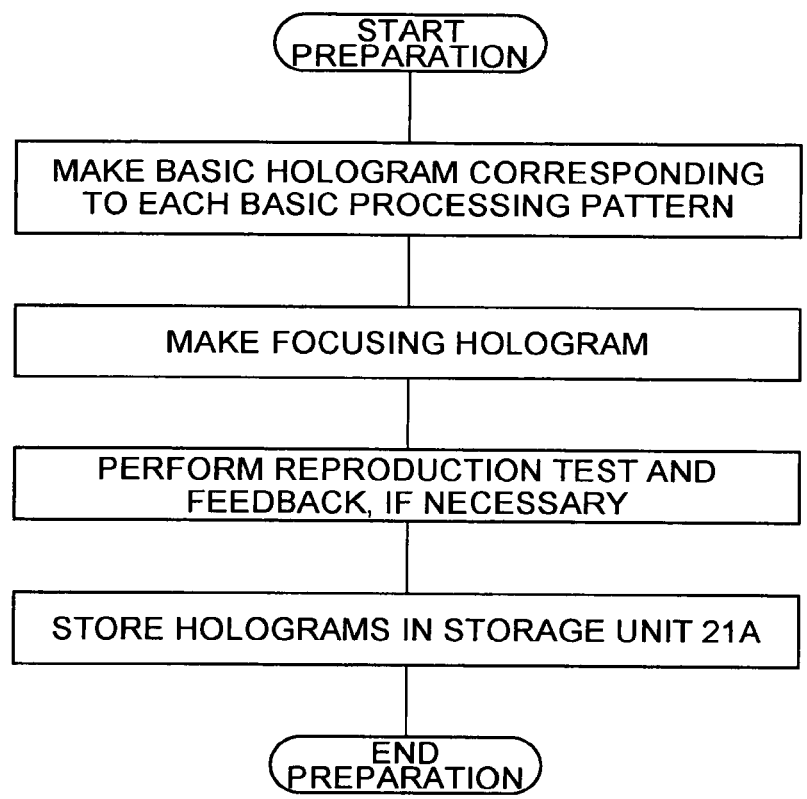
FIG. 2 is a flowchart illustrating a process of preparing basic holograms and a focusing hologram according to the embodiment.

FIG. 2 is a flowchart illustrating a process of preparing the basic holograms and the focusing hologram according to this embodiment. As shown in the flowchart, a plurality of basic holograms corresponding to a plurality of basic processing patterns that are likely to be marked are made, and a focusing hologram corresponding to the Fresnel lens pattern is made. If necessary, these basic holograms are corrected by a reproduction test and a feedback operation. The basic holograms and the focusing hologram are stored in the storage unit 21A.

A GS method, which is an algorithm for making the basic holograms, uses a random phase as an initial phase, and the function of the basic holograms can be significantly lowered in some cases due to the random phase. In addition, there may be an error between simulation and an experiment optical system (for example, the spatial light modulator 20 or the laser light source 10). It is possible to make a high-quality basic hologram by performing correction, such as feedback, in order to improve the error.

The focal length and arrangement position of a focusing hologram corresponding to the Fresnel lens pattern are appropriately set and adjusted in advance, depending on the reproduction conditions. It is preferable that the radius of the focusing hologram be set such that the focusing hologram is inscribed in the basic hologram. In addition, both the basic hologram and the focusing hologram may have any shape as long as the loss of phase information is prevented. For example, both the basic hologram and the focusing hologram may have rectangular or circular shapes or other shapes.

Figure 3:
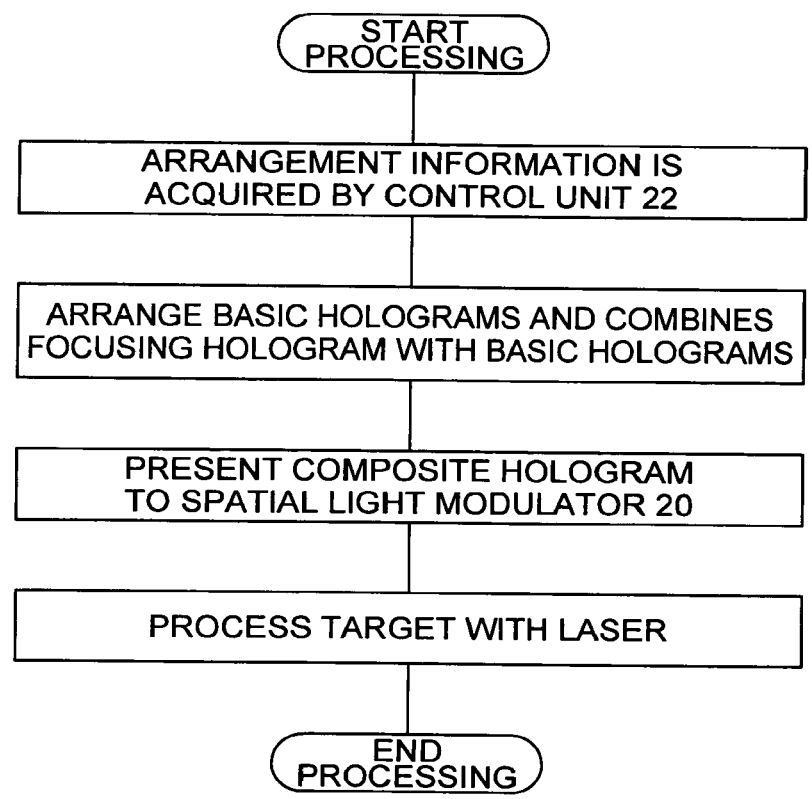
FIG. 3 is a flowchart illustrating a process of performing laser processing using the basic holograms and the focusing hologram according to the embodiment.
Figure 4:
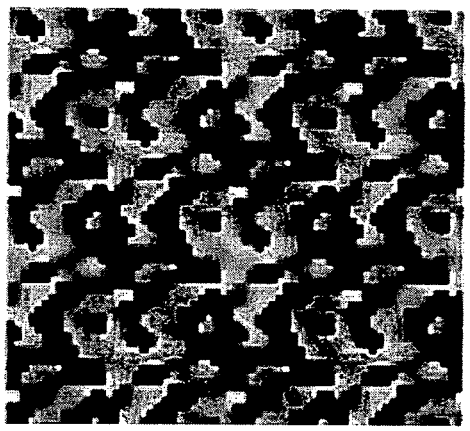
FIGS. 4A and 4B are diagrams illustrating examples of the basic hologram.
Figure 4:
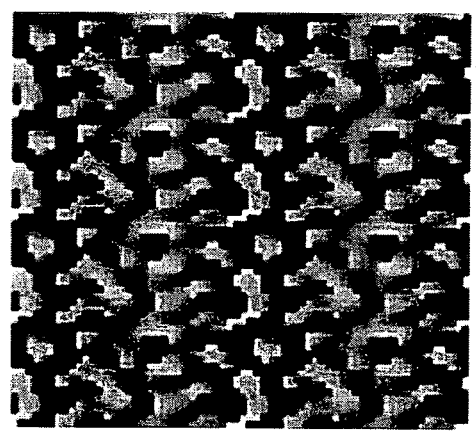

FIG. 3 is a flowchart illustrating laser processing using the basic holograms and the focusing hologram according to this embodiment. As shown in the flowchart, during the laser processing, the control unit 22 obtains necessary basic processing patterns and arrangement information on the basis of the whole processing pattern of the processing target 91, arranges the basic holograms corresponding to the basic processing patterns on the basis of the obtained information, and combines the focusing hologram with the basic holograms to make a composite hologram. The composite hologram is presented to the spatial light modulator 20, and the processing target 91 is processed (marked) by the laser light output from the laser light source 10.

In this case, in the whole hologram, it is preferable that random phase modulation is performed in a region in which the basic hologram and the focusing hologram do not overlap each other and a region having neither the basic hologram nor the focusing hologram. In this way, since the laser light output from these regions is not focused by the imaging optical system 30, the laser light does not contribute to laser processing.

Figure 12:
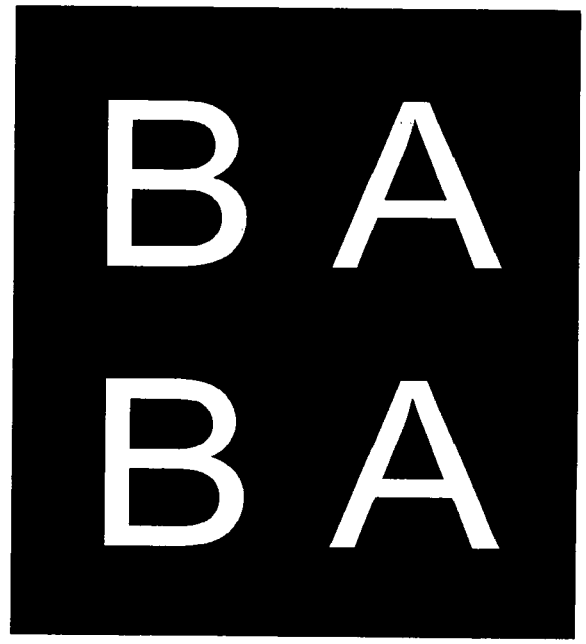
FIG. 12 is a diagram illustrating an example of the processing pattern.
Figure 13:
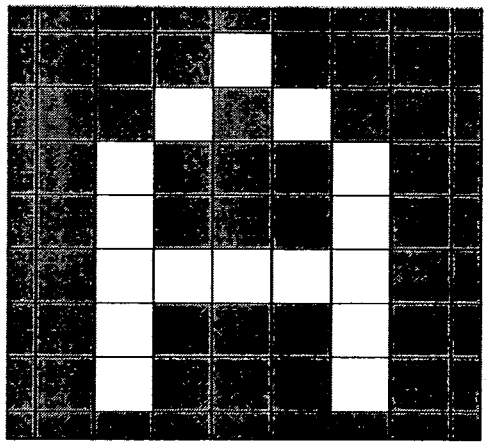
FIGS. 13A and 13B are diagrams illustrating the relationship between the size of the basic hologram and the size of the basic processing pattern.
Figure 13:
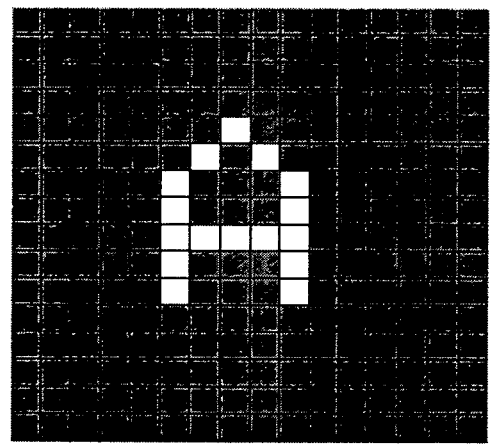
Figure 14:
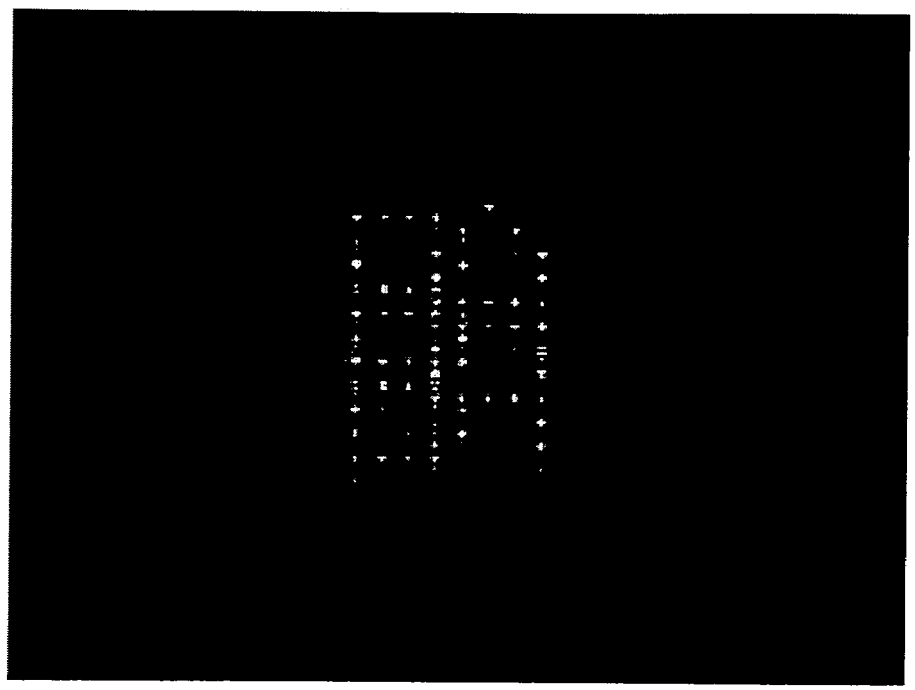
FIG. 14 is a diagram illustrating the overlap between a plurality of basic processing patterns on a processing surface of the processing target.
Figure 15:
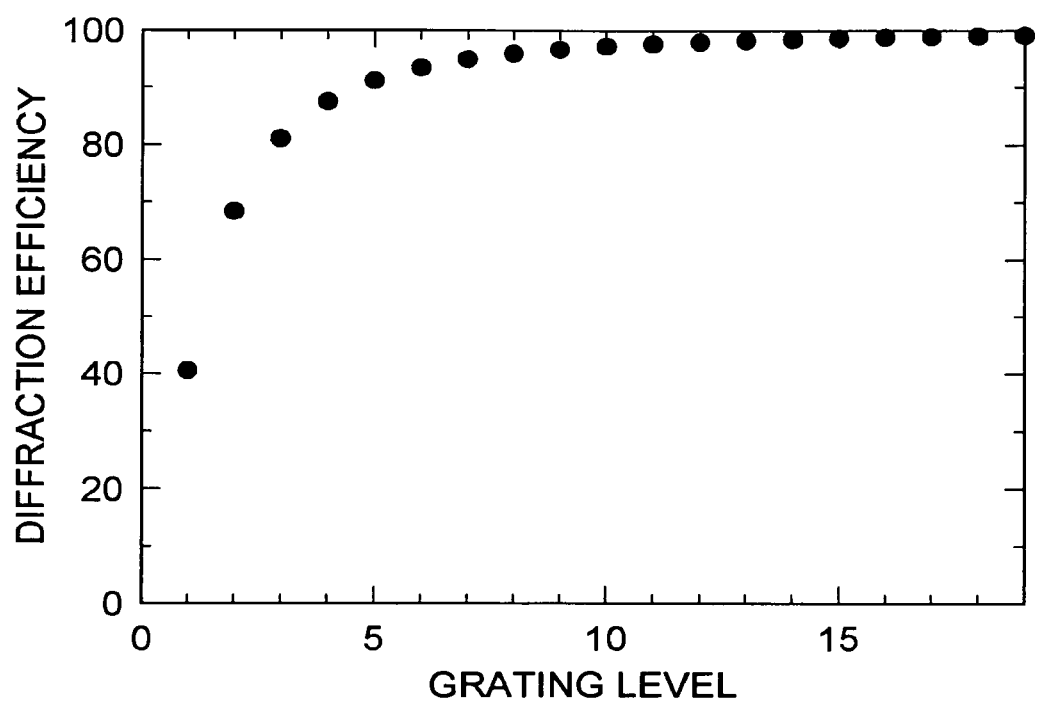
FIG. 15 is a graph illustrating the diffraction efficiency of a blazed grating.

Next, an example of making the whole hologram on the basis of the basic holograms and the focusing hologram and performing laser processing will be described with reference to FIGS. 4 to 8. Here, the case in which the processing pattern obtained by arranging a character string "BABA" in two rows and two columns as shown in FIG. 12 is collectively marked will be described. In this case, the basic holograms that have been made in advance and then stored in the storage unit 21A include at least a basic hologram (FIG. 4A) corresponding to a basic processing pattern "A" and a basic hologram (FIG. 4B) corresponding to a basic processing pattern "B".

Figure 5:
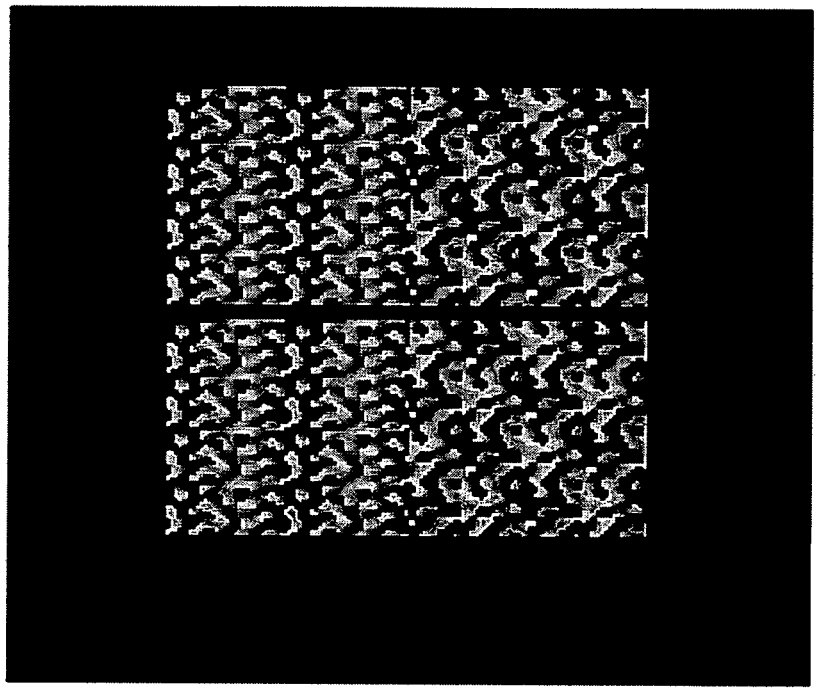
FIG. 5 is a diagram illustrating an example of the basic holograms arranged in two rows and two columns.
Figure 6:
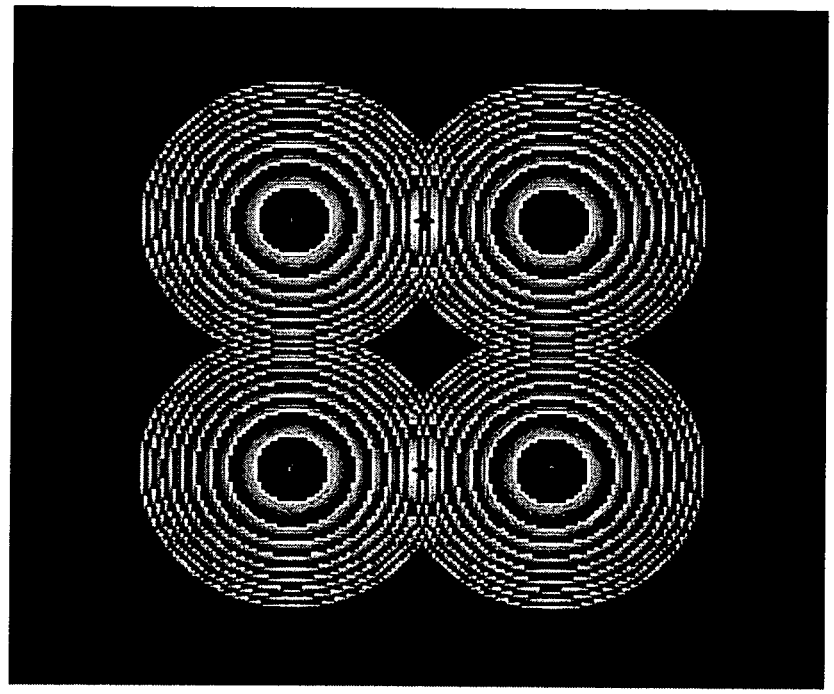
FIG. 6 is a diagram illustrating an example of the focusing holograms arranged in two rows and two columns.
Figure 7:
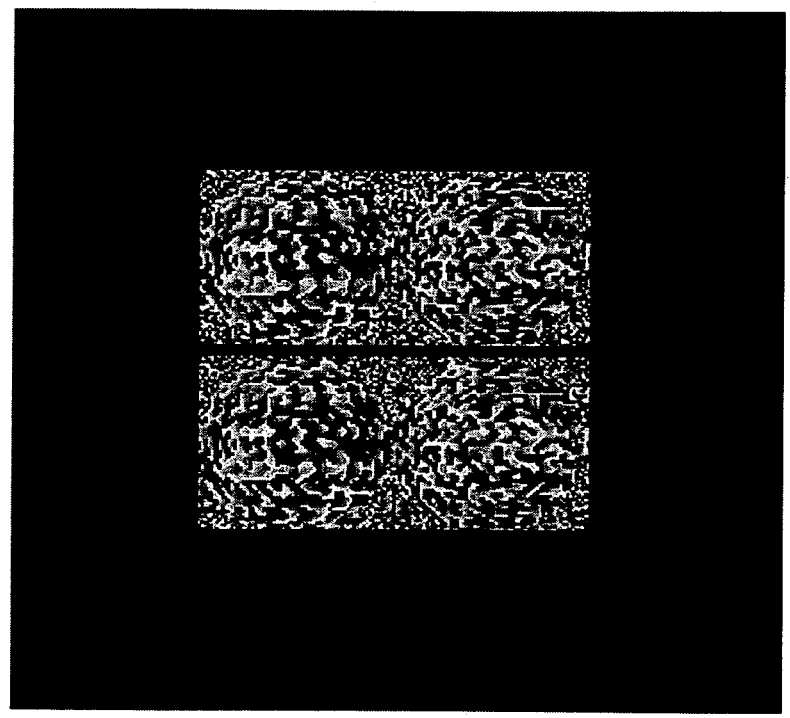
FIG. 7 is a diagram illustrating an example of the whole hologram.

The basic hologram (FIG. 4A) corresponding to the basic processing pattern "A" and the basic hologram (FIG. 4B) corresponding to the basic processing pattern "B" are arranged in two rows and two columns so as to correspond to the processing pattern obtained by arranging the character string "BABA" in two rows and two columns as shown in FIG. 12 (FIG. 5). In addition, four focusing holograms are also arranged in two rows and two columns so as to correspond to the above arrangement (FIG. 6). The four basic holograms arranged in two rows and two columns (FIG. 5) and the four focusing holograms arranged in two rows and two columns (FIG. 6) overlap each other to make the whole hologram (FIG. 7).

Figure 8:
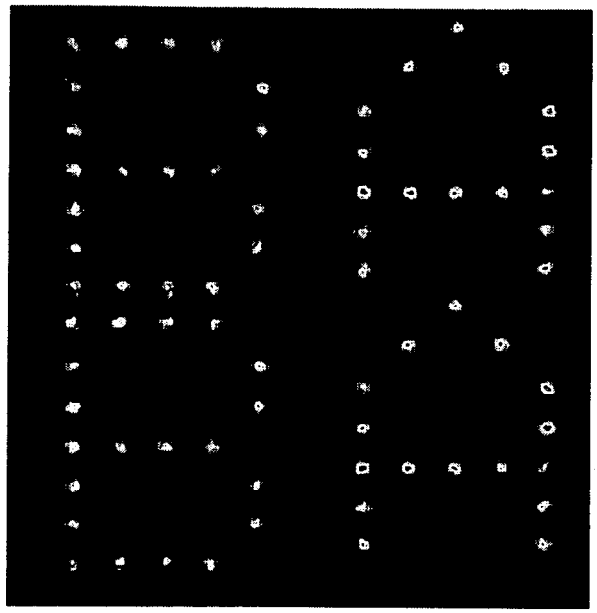
FIG. 8 is a diagram illustrating an example of the laser processing (marking) performed on a processing target 91.

The whole hologram (FIG. 7) made in this way is presented to the spatial light modulator 20. Then, the laser light output from the laser light source 10 passes through the spatial filter 11, the collimator lens 12, the mirror 13, and the mirror 14 and is then input to the spatial light modulator 20. The spatial light modulator 20 spatially modulates the phase of the laser light. The laser light whose phase is modulated by the spatial light modulator 20 is focused on the processing target 91 by the imaging optical system 30 including a telecentric optical system that is arranged such that the relationship between focusing and the focal length of the focusing hologram is established. In this way, high-quality laser processing (marking) is performed on the processing target 91 (FIG. 8).

In this embodiment, for example, when the basic processing pattern is composed of alphabetic letters or numbers, the number of basic processing patterns is 36, and only 36 basic holograms and one focusing hologram are sufficient. Therefore, the amount of data stored in the storage unit 21A is reduced, as compared to the related art. When the whole processing pattern including some of the 36 basic processing patterns is used to process the processing target 91, some basic holograms may be selected from the 36 basic holograms and then arranged in parallel. Therefore, in the processing stage of this embodiment, it is not necessary to make a processing pattern and a hologram for each processing target, unlike the related art. In addition, even when the number of basic processing patterns included in the whole processing pattern is increased or decreased, the size of the whole hologram that is finally output does not vary. Therefore, there is no adverse effect.

In addition, in this embodiment, in order to present a plurality of basic holograms corresponding to a plurality of basic processing patterns to the spatial light modulator 20, the size of the basic hologram is reduced, and a focusing hologram with a small focal length overlaps as a unit for preventing the enlargement of a reproduction image with a reduction in the resolution of the basic hologram. In this case, since the reproduction image appears in the vicinity of the surface of the spatial light modulator 20, the imaging optical system 30 is used such that a plurality of basic processing patterns do not overlap each other on the processing target 91.

The laser processing apparatus 1 according to this embodiment presents a plurality of basic holograms to one spatial light modulator 20. Therefore, it is possible to reduce the size of the laser processing apparatus. In addition, since the size of the basic hologram is small, it is easy to store the basic hologram in the storage unit 21A of the driving unit 21. In this case, since data transmitted from the control unit 22 is limited to information on the kind of basic processing pattern and the arrangement position thereof, it is expected to significantly improve the transmission speed of the information.

Figure 9:
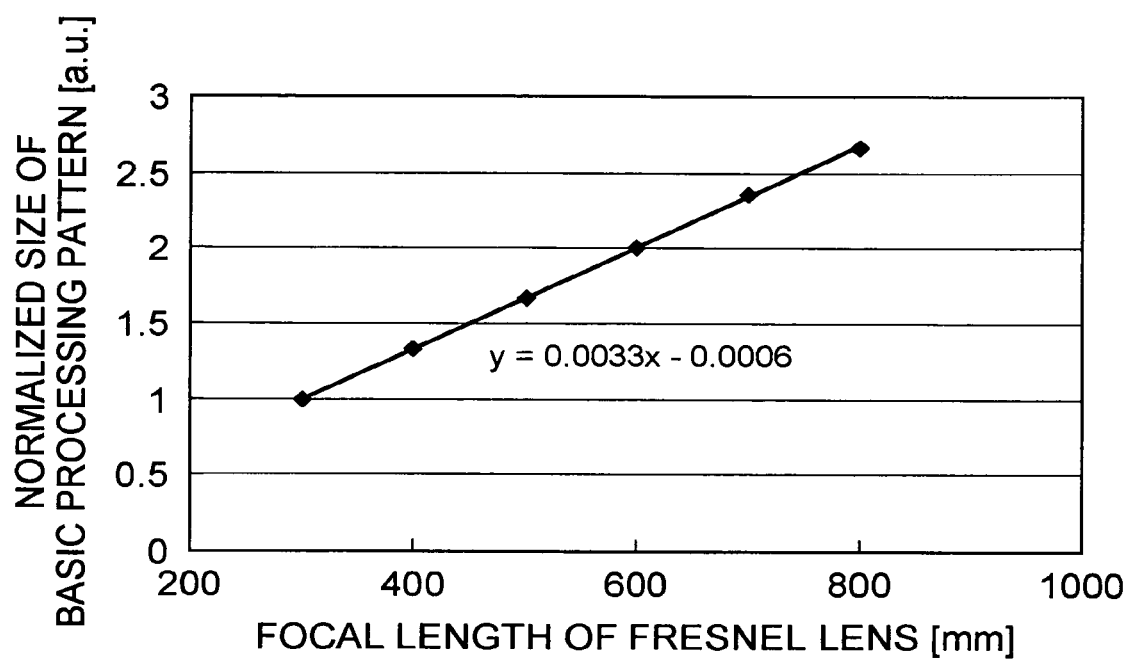
FIG. 9 is a graph illustrating the relationship between the focal length of a Fresnel lens and the size of a basic processing pattern.
Figure 11:
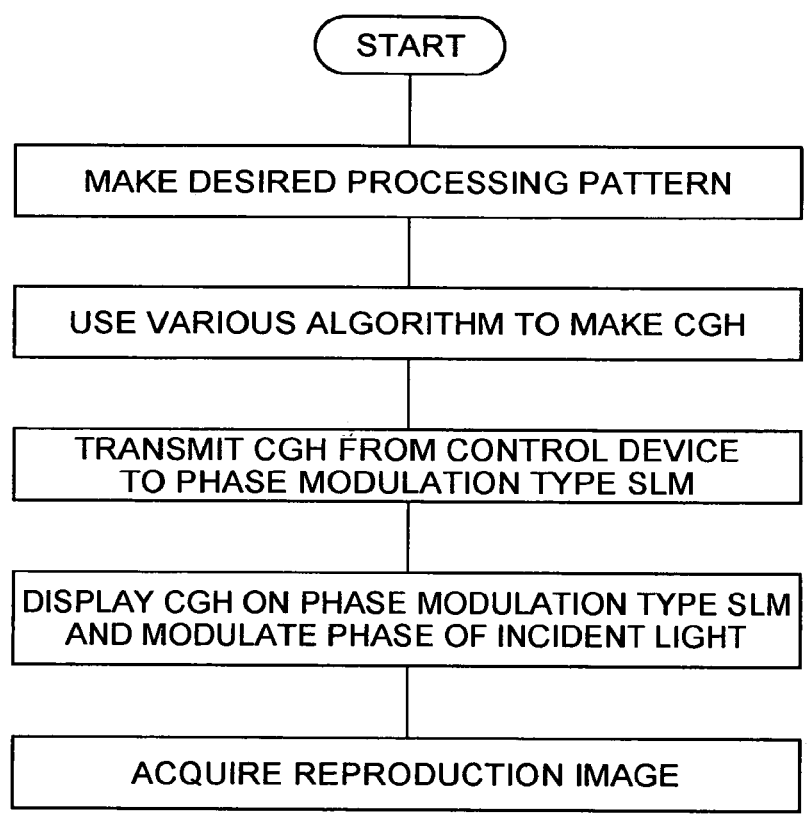
FIG. 11 is a flowchart illustrating a laser processing method using a phase modulation type spatial light modulator.

In the laser processing apparatus 1 according to this embodiment, it is preferable that the storage unit 21A store a plurality of focusing holograms corresponding to a plurality of Fresnel lens patterns having different focal lengths and the imaging position and imaging magnification of the imaging optical system 30 be variable. In addition, it is preferable that the control unit 22 control the focal length of the focusing hologram that overlaps the basic hologram and the imaging position of the imaging optical system so as to be associated with each other. As such, it is possible to adjust the size of the basic processing pattern on the processing target 91 by preparing a plurality of focusing holograms having different focal lengths and changing the focal length of the focusing hologram overlapped with the basic processing patterns (FIG. 9). In this case, the imaging position on the surface of the spatial light modulator 20 may be changed greatly. Therefore, in this case, it is necessary to adjust the imaging position and imaging magnification of the imaging optical system 30. In addition, it is possible to change the size of the whole processing pattern on the processing target 91 by changing the enlargement ratio/reduction ratio of the imaging optical system 30.

Figure 10:
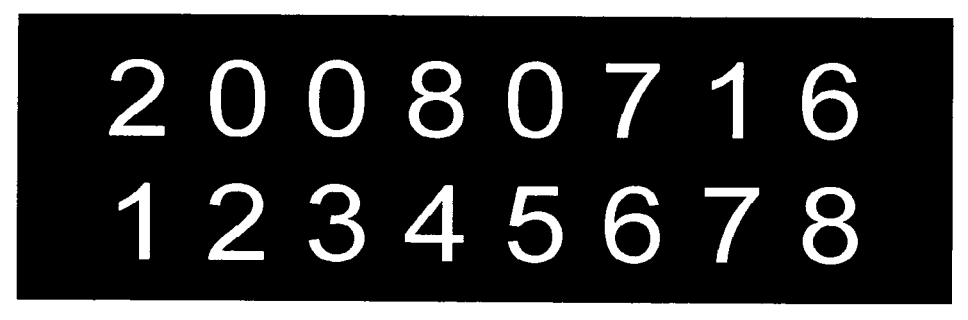

In the whole processing pattern that is long in the horizontal direction, such as a laser marking pattern, when the above-mentioned characteristics are used, the spatial light modulator 20 can display the whole hologram composed of a plurality of basic holograms in multiple stages even when it has a small size. For example, when the whole processing pattern shown in FIG. 10 is considered, the processing pattern includes 8 basic processing patterns indicating the date of manufacture in the first row and 8 basic processing patterns indicating a serial number in the second row. When a basic hologram corresponding to each basic processing pattern has a size of 64 pixels by 64 pixels, the whole hologram corresponding to the whole processing pattern has a size of 512 pixels by 128 pixels. When the number of pixels of the spatial light modulator 20 is 512 pixels by 512 pixels, the whole hologram may be arranged on the spatial light modulator 20 in four stages in the vertical direction.

As described above, in this embodiment, the size of the basic processing pattern on the processing target 91 varies depending on the focal length of the Fresnel lens pattern, in addition to the size of the basic hologram. Therefore, it is possible to reduce the size of the basic hologram to a quarter of the size of the basic hologram according to the related art. As such, it is possible to reduce the size of the basic hologram and thus increase the number of basic holograms presented to one spatial light modulator 20.

Therefore, mechanical scanning is performed with the laser light incident on the spatial light modulator 20 and the laser light radiated to the processing target 91 by arranging a plurality of whole holograms in parallel on the spatial light modulator 20 to present the holograms to the spatial light modulator 20 and adjusting the incident position of laser light on the spatial light modulator 20 using a mechanical unit (for example, the mirror 13 or the mirror 14 having a galvano scanner mechanism) or a shutter provided between the laser light source 10 and the spatial light modulator 20, adjusting the position of the processing target 91 using the moving line 90, or adjusting the optical path of the imaging optical system 30. In this case, it is possible to expect the same effect as that obtained when a plurality of spatial light modulators are arranged on one spatial light modulator 20 in a pseudo manner, and it is possible to improve the pseudo response speed of the spatial light modulators whose number corresponds to the number of stages (in this embodiment, four spatial light modulators). As described above, it is possible to significantly improve the processing speed of the spatial light modulator 20 relative to the potential response speed thereof.

In this embodiment, since the imaging optical system 30 is used, the focusing of zeroth-order light due to a Fourier lens does not occur, unlike a Fourier type, and the zeroth-order light is spread to the background. In this case, the signal-to-noise ratio deteriorates, but noise is less than the threshold value of a laser marking process. Therefore, laser processing according to this embodiment can be performed. In addition, there is no zeroth-order light at the center of a processing region of the processing target 91. Therefore, a mask for shielding the zeroth-order light is not used, and it is possible to use the whole surface of the spatial light modulator 20.

Further, in this embodiment, a blazed grating is not used, but focusing by the Fresnel lens pattern is used. The overall amount of laser light incident on the spatial light modulator 20 can contribute to forming the processing pattern. Therefore, a constant amount of laser light is incident on the whole surface of the spatial light modulator 20, and it is possible to achieve laser processing with high light uniformity.

The invention is not limited to the above-described embodiment, but various modifications and changes of the invention can be made without departing from the scope and spirit of the invention. For example, in the above-described embodiment, the storage unit that stores the basic hologram and the focusing hologram is provided in the driving unit 21. However, the storage unit may not be provided in the driving unit 21. For example, the storage unit may be provided in the control unit 22.

What is claimed is:

1. A laser processing apparatus that radiates laser light to a processing target and collectively processes the processing target with a whole processing pattern including two or more basic processing patterns, comprising:
    a laser light source that outputs the laser light;
    a phase modulation type spatial light modulator that receives the laser light output from the laser light source, allows each of a plurality of pixels two-dimensionally arranged therein to be presented as a whole hologram for modulating the phase of the laser light, and outputs the phase-modulated laser light;
    an imaging optical system that receives the laser light output from the spatial light modulator and focuses the laser light on the processing target;
    a storage unit that stores a plurality of basic holograms corresponding to a plurality of basic processing patterns and a focusing hologram corresponding to a Fresnel lens pattern; and
    a control unit that arranges in parallel two or more basic holograms selected from the plurality of basic holograms stored in the storage unit, overlaps the focusing hologram with each of the basic holograms arranged in parallel to form the whole hologram, and presents the formed whole hologram to the spatial light modulator.

2. The laser processing apparatus according to claim 1, wherein the imaging optical system includes a telecentric optical system.

3. The laser processing apparatus according to claim 1, wherein the storage unit stores a plurality of focusing holograms corresponding to a plurality of Fresnel lens patterns having different focal lengths,
    the imaging position and imaging magnification of the imaging optical system are variable, and
    the control unit controls the focal length of the focusing hologram overlapped with the basic hologram and the imaging position or the imaging magnification of the imaging optical system so as to be associated with each other.

4. The laser processing apparatus according to claim 1, wherein the control unit arranges a plurality of whole holograms on the spatial light modulator in parallel and presents the whole holograms to the spatial light modulator, and the laser processing apparatus includes:
- an incident position adjusting unit that allows the laser light output from the laser light source to be sequentially incident on the plurality of whole holograms presented to the spatial light modulator; and
- an imaging position adjusting unit that adjusts the imaging position of the laser light on the processing target by the imaging optical system.

5. The laser processing apparatus according to claim 1, wherein the focusing hologram is inscribed inside a corresponding basic hologram.

6. A laser processing method that radiates laser light to a processing target and collectively processes the processing target with a whole processing pattern including two or more basic processing patterns, using a laser light source that outputs the laser light, a phase modulation type spatial light modulator that receives the laser light output from the laser light source, allows each of a plurality of pixels two-dimensionally arranged therein to be presented as a whole hologram for modulating the phase of the laser light, and outputs the phase-modulated laser light, an imaging optical system that receives the laser light output from the spatial light modulator and focuses the laser light on the processing target, and a storage unit that stores a plurality of basic holograms corresponding to a plurality of basic processing patterns and a focusing hologram corresponding to a Fresnel lens pattern, the method comprising:
- arranging in parallel two or more basic holograms selected from the plurality of basic holograms stored in the storage unit;
- overlapping the focusing hologram with each of the basic holograms arranged in parallel to form the whole hologram; presenting the formed whole hologram to the spatial light modulator;
- allowing the laser light output from the laser light source to be incident on the spatial light modulator; and
- allowing the imaging optical system to focus the laser light output from the spatial light modulator on the processing target.

7. The laser processing method according to claim 6, wherein the imaging optical system includes a telecentric optical system.

8. The laser processing method according to claim 6, wherein the storage unit stores a plurality of focusing holograms corresponding to a plurality of Fresnel lens patterns having different focal lengths,
the imaging position and imaging magnification of the imaging optical system are variable, and
the focal length of the focusing hologram overlapped with the basic holograms and the imaging position or the imaging magnification of the imaging optical system are controlled so as to be associated with each other.

9. The laser processing method according to claim 6,
wherein a plurality of whole holograms are arranged in parallel on the spatial light modulator and are presented to the spatial light modulator,
the laser light output from the laser light source is sequentially incident on the plurality of whole holograms presented to the spatial light modulator, and
the imaging position of the laser light on the processing target by the imaging optical system is adjusted.

10. The laser processing method according to claim 6, wherein the focusing hologram is inscribed inside a corresponding basic hologram.

11. A laser emitting apparatus that radiates laser light to a processing target and collectively processes the processing target with a whole processing pattern including two or more basic processing patterns, comprising:
- a laser light source that outputs the laser light;
- a phase modulation type spatial light modulator that receives the laser light output from the laser light source, allows each of a plurality of pixels two-dimensionally arranged therein to be presented as a whole hologram for modulating the phase of the laser light, and outputs the phase-modulated laser light;
- an imaging optical system that receives the laser light output from the spatial light modulator and focuses the laser light on the processing target;
- a storage unit that stores a plurality of basic holograms corresponding to a plurality of basic processing patterns and a focusing hologram corresponding to a Fresnel lens pattern; and
- a control unit that arranges in parallel two or more basic holograms selected from the plurality of basic holograms stored in the storage unit, overlaps the focusing hologram with each of the basic holograms arranged in parallel to form the whole hologram, and presents the formed whole hologram to the spatial light modulator.

12. The laser emitting apparatus according to claim 11, wherein the focusing hologram is inscribed inside a corresponding basic hologram.

* * * * *